US009954787B2

(12) United States Patent
Zhang et al.

(10) Patent No.: US 9,954,787 B2
(45) Date of Patent: Apr. 24, 2018

(54) INTELLIGENT TERMINAL POWER-SAVING MANAGEMENT METHOD AND APPARATUS

(71) Applicant: Huawei Technologies Co., Ltd., Shenzhen (CN)

(72) Inventors: Huimin Zhang, Shenzhen (CN); Kangmin Huang, Shenzhen (CN); Bo Huang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 207 days.

(21) Appl. No.: 14/816,663

(22) Filed: Aug. 3, 2015

(65) Prior Publication Data

US 2015/0373723 A1 Dec. 24, 2015

Related U.S. Application Data

(63) Continuation of application No. PCT/CN2014/094702, filed on Dec. 23, 2014.

(30) Foreign Application Priority Data

Jun. 23, 2014 (CN) .......................... 2014 1 0284243

(51) Int. Cl.
*H04W 56/00* (2009.01)
*H04L 12/801* (2013.01)
(Continued)

(52) U.S. Cl.
CPC ......... *H04L 47/29* (2013.01); *H04W 52/0216* (2013.01); *H04W 76/046* (2013.01); *Y02B 60/50* (2013.01)

(58) Field of Classification Search
CPC ...................................................... H04L 47/29
(Continued)

(56) References Cited

U.S. PATENT DOCUMENTS

2005/0025081 A1 2/2005 Wakamatsu
2007/0058580 A1 3/2007 Chae
(Continued)

FOREIGN PATENT DOCUMENTS

CN 1937818 A 3/2007
CN 101661321 A 3/2010
(Continued)

OTHER PUBLICATIONS

Partial English Translation and Abstract of Chinese Patent Application No. CN101661321, dated Mar. 24, 2016, 15 pages.
(Continued)

*Primary Examiner* — Dang Ton
(74) *Attorney, Agent, or Firm* — Conley Rose, P.C.

(57) ABSTRACT

An intelligent terminal power-saving management method and apparatus, wherein the method includes acquiring, by a second intelligent terminal, a power-saving control policy, where the power-saving control policy includes an interval for enabling a communications module, the interval for enabling the communications module is greater than a power-saving period of the communications module, and the power-saving period is a built-in power-saving control policy of the communications module, counting, by the second intelligent terminal, duration when the interval for enabling the communications module is acquired, enabling, by the second terminal, the communications module to perform communication when the duration is greater than or equal to the interval for enabling the communications module, and disabling, by the second intelligent terminal, the communications module when the communication ends. Using the apparatus can reduce power consumption and extend usage time of an intelligent terminal.

28 Claims, 11 Drawing Sheets

A second intelligent terminal acquires a power-saving control policy, where the power-saving control policy includes an interval for enabling a communications module — 101

The second intelligent terminal counts duration when the interval for enabling the communications module is acquired and a power-saving policy status identifier is an enabling identifier — 201

The second intelligent terminal enables the communications module, and acquires, by using the communications module, a to-be-processed task from a first intelligent terminal that communicates with the second intelligent terminal when the duration is equal to or greater than the time interval for enabling the communications module — 202

Monitor remaining power; and the second terminal enables an electronic ink display and disables a liquid crystal display when the remaining power is less than or equal to a first preset power threshold — 203

The second unit instructs a first processor to stop running, and instructs a second processor to process a task of the first processing unit when the remaining power is less than or equal to the second preset power threshold, where power consumption of the second processor is less than power consumption of the first processor — 204

Disable the communications module when the to-be-processed task is processed — 205

(51) Int. Cl.
*H04W 76/04* (2009.01)
*H04W 52/02* (2009.01)

(58) Field of Classification Search
USPC ........................................................ 370/339
See application file for complete search history.

(56) References Cited

U.S. PATENT DOCUMENTS

| | | | | |
|---|---|---|---|---|
| 2007/0083780 | A1 | 4/2007 | Aoyagi et al. | |
| 2010/0260084 | A1 | 10/2010 | Imamura et al. | |
| 2011/0080417 | A1 | 4/2011 | Lin et al. | |
| 2012/0177361 | A1* | 7/2012 | Hirano | H04B 10/272 398/1 |
| 2012/0254878 | A1 | 10/2012 | Nachman et al. | |
| 2016/0066269 | A1 | 3/2016 | Banerjea | |

FOREIGN PATENT DOCUMENTS

| | | | |
|---|---|---|---|
| CN | 101843150 | A | 9/2010 |
| CN | 102089932 | A | 6/2011 |
| CN | 103472906 | A | 12/2013 |
| CN | 103677429 | A | 3/2014 |
| CN | 103768710 | A | 5/2014 |
| CN | 103809726 | A | 5/2014 |
| CN | 104035543 | A | 9/2014 |
| JP | 2014067143 | A | 4/2014 |
| KR | 20120084057 | A | 7/2012 |

OTHER PUBLICATIONS

Partial English Translation and Abstract of Chinese Patent Application No. CN103809726, dated Mar. 24, 2016, 16 pages.
Foreign Communication From a Counterpart Application, European Application No. 14880375.2, Extended European Search Report dated Mar. 23, 2016, 9 pages.
Foreign Communication From a Counterpart Application, European Application No. 201410284243.2, Chinese Office Action dated Feb. 3, 2016, 8 pages.
Foreign Communication From a Counterpart Application, European Application No. 201410284243.2, Chinese Search Report dated Jan. 20, 2016, 2 pages.
Partial English Translation and Abstract of Chinese Patent Application No. CN103472906, dated Nov. 3, 2015, 9 pages.
Partial English Translation and Abstract of Chinese Patent Application No. CN103677429, dated Jul. 30, 2015, 4 pages.
Partial English Translation and Abstract of Chinese Patent Application No. CN103768710, dated Jul. 30, 2015, 4 pages.
Partial English Translation and Abstract of Chinese Patent Application No. CN104035543, Part 1, Jul. 30, 2015, 12 pages.
Partial English Translation and Abstract of Chinese Patent Application No. CN104035543, Part 2, Jul. 30, 2015, 4 pages.
Foreign Communication From a Counterpart Application, PCT Application No. PCT/CN2014/094702, International Search Report dated Mar. 23, 2015, 7 pages.
Foreign Communication From a Counterpart Application, PCT Application No. PCT/CN2014/094702, Written Opinion dated Mar. 23, 2015, 7 pages.
Foreign Communication From a Counterpart Application, Chinese Application No. 201410284243.2, Chinese Office Action dated Apr. 14, 2017, 10 pages.

* cited by examiner

INTELLIGENT TERMINAL POWER-SAVING MANAGEMENT METHOD AND APPARATUS

CROSS-REFERENCE TO RELATED APPLICATIONS

This application is a continuation of International Application No. PCT/CN2014/094702, filed on Dec. 23, 2014, which claims priority to Chinese Patent Application No. 201410284243.2, filed on Jun. 23, 2014, both of which are hereby incorporated by reference in their entireties.

TECHNICAL FIELD

The present disclosure relates to the terminal field, and to an intelligent terminal power-saving management method and apparatus.

BACKGROUND

Short standby time and fast power consumption of batteries of intelligent terminals have always been problems criticized by users. According to a survey, 60% of power consumption of an intelligent terminal comes from a liquid crystal display. In addition, working of various application programs and a communications module is also a reason leading to fast power consumption and short standby time of a battery.

To resolve the problem of fast power consumption of a battery of an intelligent terminal, a solution is included in the prior art. Remaining battery power of the intelligent terminal is monitored; and when the remaining battery power is less than a preset threshold, brightness of a screen is reduced, or a service such as a connection of the intelligent terminal is disabled.

It can be learned from the foregoing description that in the prior art, remaining battery power of an intelligent terminal is monitored; and when the remaining battery power of the intelligent terminal is less than a preset threshold, some functions are limited to extend standby time of a battery of the intelligent terminal. The solution is relatively rigid; and some commonly used functions are limited once the remaining battery power of the intelligent terminal is less than the preset threshold, thereby diminishing user experience.

SUMMARY

Embodiments of the present disclosure provide an intelligent terminal power-saving management method and apparatus, which can reduce power consumption, extend standby time of a battery of an intelligent terminal, and enhance user experience.

A first aspect of an embodiment of the present disclosure discloses an intelligent terminal power-saving management method, where the method includes acquiring, by a second intelligent terminal, a power-saving control policy, where the power-saving control policy includes an interval for enabling a communications module; the interval for enabling the communications module is greater than a power-saving period of the communications module; and the power-saving period is a built-in power-saving control policy of the communications module; counting, by the second intelligent terminal, duration when the interval for enabling the communications module is acquired, enabling, by the second terminal, the communications module to perform communication when the duration is greater than or equal to the interval for enabling the communications module, and disabling, by the second intelligent terminal, the communications module when the communication ends.

With reference to the first aspect, in a first possible implementation manner of the first aspect, the enabling, by the second intelligent terminal, the communications module to perform communication includes enabling, by the second intelligent terminal, the communications module, and acquiring, by using the communications module, a to-be-processed task from a first intelligent terminal that communicates with the second intelligent terminal, where the disabling, by the second intelligent terminal, the communications module when the communication ends includes disabling, by the second intelligent terminal, the communications module when the to-be-processed task is processed.

With reference to the first possible implementation manner of the first aspect, in a second possible implementation manner of the first aspect, the to-be-processed task includes a type of a notification that needs to be queried, where the acquiring, by using the communications module, a to-be-processed task from a first intelligent terminal that communicates with the second intelligent terminal includes sending a query request to the first intelligent terminal, where the query request includes the type of the notification that needs to be queried, so that the first intelligent terminal acquires, from a cache, a notification that matches the type of the notification that needs to be queried, and receiving a notification sent by the first intelligent terminal, where the disabling, by the second intelligent terminal, the communications module when the to-be-processed task is processed includes disabling, by the second intelligent terminal, the communications module when the received notification is processed.

With reference to the first possible implementation manner of the first aspect, in a third possible implementation manner of the first aspect, the to-be-processed task includes a type of a notification that needs to be queried, where the acquiring, by using the communications module, a to-be-processed task from a first intelligent terminal that communicates with the second intelligent terminal includes receiving, by using the communications module, a notification pushed by the first intelligent terminal that communicates with the second intelligent terminal, where the notification is a message notification to which the second intelligent terminal subscribes, where the disabling, by the second intelligent terminal, the communications module when the to-be-processed task is processed includes disabling, by the second intelligent terminal, the communications module when the notification is processed.

With reference to the first aspect, the first possible implementation manner of the first aspect, the second possible implementation manner of the first aspect, or the third possible implementation manner of the first aspect, in a fourth possible implementation manner of the first aspect, the power-saving control policy further includes a power-saving control policy status identifier, where the counting duration when the interval for enabling the communications module is acquired includes counting, by the second intelligent terminal, the duration when the interval for enabling the communications module is acquired and the power-saving control policy status identifier is an enabling identifier.

With reference to the fourth possible implementation manner of the first aspect, in a fifth possible implementation manner of the first aspect, the power-saving control policy further includes a first preset power threshold, and the second intelligent terminal includes an electronic ink display and a liquid crystal display, and when the power-saving control policy status identifier is an enabling identifier, the method further includes monitoring, by the second intelligent terminal, remaining power, and enabling, by the second intelligent terminal, the electronic ink display, and disabling the liquid crystal display when the remaining power is less than or equal to the first preset power threshold.

With reference to the fifth possible implementation manner of the first aspect, in a sixth possible implementation manner of the first aspect, the power-saving control policy further includes a second preset power threshold, and after the monitoring remaining power, the method further includes instructing, by the second terminal, a first processor to stop running, and instructing a second processor to process a task of the first processor when the remaining power is less than or equal to the second preset power threshold, where power consumption of the second processor is less than power consumption of the first processor.

With reference to the sixth possible implementation manner of the first aspect, in a seventh possible implementation manner of the first aspect, before the instructing, by the second intelligent terminal, a first processor to stop running, the method further includes acquiring, by the second intelligent terminal, a first task executed by the first processor, matching, by the second intelligent terminal, the first task with a preset basic task list to obtain a second task, and migrating, by the second intelligent terminal, the second task to the second processor for processing.

With reference to the seventh possible implementation manner of the first aspect, in an eighth possible implementation manner of the first aspect, the migrating, by the second intelligent terminal, the second task to the second processor for processing includes migrating, by the second intelligent terminal, data of the second task from the first processor to the second processor, and instructing the first processor to enter a hibernation state.

A second aspect of an embodiment of the present disclosure discloses an intelligent terminal power-saving management method, where the method includes establishing, by a first intelligent terminal, a connection with a second intelligent terminal, acquiring, by the first intelligent terminal, an interval for enabling a communications module of the second intelligent terminal, determining, by the first intelligent terminal according to the interval for enabling the communications module, a state of the communications module of the second intelligent terminal, storing, by the first intelligent terminal, a message that needs to be sent to the second intelligent terminal when the communications module of the second intelligent terminal is in a disabled state, and sending, to the second intelligent terminal by the first intelligent terminal, the stored message that needs to be sent to the second intelligent terminal when the communications module of the second intelligent terminal is in an enabled state.

With reference to the second aspect, in a first possible implementation manner of the second aspect, before the sending, to the second intelligent terminal by the first intelligent terminal, the stored message that needs to be sent to the second intelligent terminal, the method further includes receiving, by the first intelligent terminal, a message acquiring request sent by the second terminal, where the sending, to the second intelligent terminal by the first intelligent terminal, the stored message that needs to be sent to the second intelligent terminal includes sending, to the second intelligent terminal by the first intelligent terminal according to the request, the stored message that needs to be sent to the second intelligent terminal.

A third aspect of an embodiment of the present disclosure discloses an intelligent terminal power-saving management method, where the method includes acquiring a power-saving control policy, where the power-saving control policy includes a first preset power threshold, monitoring remaining power, and enabling an electronic ink display and disabling a liquid crystal display when the remaining power is less than or equal to the first preset power threshold.

With reference to the third aspect, in a first possible implementation manner of the third aspect, the power-saving control policy further includes a second preset power threshold; and after the monitoring remaining power, the method further includes instructing a first processor to stop running, and instructing a second processor to process a task of the first processor when the remaining power is less than or equal to the second preset power threshold, where power consumption of the second processor is less than power consumption of the first processor.

With reference to the first possible implementation manner of the third aspect, in a second possible implementation manner of the third aspect, the second processor is an embedded single-chip microcomputer.

With reference to the first possible implementation manner of the third aspect or the second possible implementation manner of the third aspect, in a third possible implementation manner of the third aspect, before the instructing a first processor to stop running, the method further includes acquiring a first task executed by the first processor, matching the first task with a preset basic task list to obtain a second task, and migrating the second task to the second processor.

With reference to the third possible implementation manner of the third aspect, in a fourth possible implementation manner of the third aspect, the migrating the second task to the second processor includes migrating data of the second task from the first processor to the second processor, where the instructing a first processor to stop running includes instructing the first processor to enter a hibernation state.

A fourth aspect of an embodiment of the present disclosure discloses an intelligent terminal, where the intelligent terminal is a second intelligent terminal, and the second intelligent terminal includes an acquiring unit configured to acquire a power-saving control policy, where the power-saving control policy includes an interval for enabling a communications module, the interval for enabling the communications module is greater than a power-saving period of the communications module, and the power-saving period is a built-in power-saving control policy of the communications module; a timing unit configured to count duration when the acquiring unit acquires the interval for enabling the communications module; an enabling unit configured to enable the communications module to perform communication when the duration obtained by the timing unit is greater than or equal to the interval for enabling the communications module; and a disabling unit configured to disable the communications module when the communication ends.

With reference to the fourth aspect, in a first possible implementation manner of the fourth aspect, the enabling unit is configured to enable the communications module, and acquire, by using the communications module, a to-be-processed task from a first intelligent terminal that communicates with the second intelligent terminal, and the disabling unit is configured to disable the communications module when the to-be-processed task is processed.

With reference to the first possible implementation manner of the fourth aspect, in a second possible implementation manner of the fourth aspect, the to-be-processed task includes a type of a notification that needs to be queried, the enabling unit includes a request subunit and a first receiving subunit, where the request subunit is configured to send a query request to the first intelligent terminal, where the query request includes the type of the notification that needs to be queried, so that the first intelligent terminal acquires, from a cache, a notification that matches the type of the notification that needs to be queried, the first receiving subunit is configured to receive a notification sent by the first intelligent terminal, and the disabling unit is configured to disable the communications module when the received notification is processed.

With reference to the first possible implementation manner of the fourth aspect, in a third possible implementation manner of the fourth aspect, the to-be-processed task includes a type of a notification that needs to be queried, the enabling unit includes a second receiving subunit, where the second receiving subunit is configured to receive, by using the communications module, a notification pushed by the first intelligent terminal that communicates with the second intelligent terminal, where the notification is a message notification to which the second intelligent terminal subscribes, and the disabling unit is configured to disable the communications module when the notification is processed.

With reference to the fourth aspect, the first possible implementation manner of the fourth aspect, the second possible implementation manner of the fourth aspect, or the third possible implementation manner of the fourth aspect, in a fourth possible implementation manner of the fourth aspect, the power-saving control policy further includes a power-saving control policy status identifier, and the timing unit is configured to count the duration when the acquiring unit acquires the interval for enabling the communications module and the power-saving control policy status identifier is an enabling identifier.

With reference to the fourth possible implementation manner of the fourth aspect, in a fifth possible implementation manner of the fourth aspect, the power-saving control policy further includes a first preset power threshold, and the second intelligent terminal includes an ink display and a liquid crystal display, and the second intelligent terminal further includes a monitoring unit and a switching unit, where the monitoring unit is configured to monitor remaining power when the power-saving control policy status identifier acquired by the acquiring unit is an enabling identifier, and the switching unit is configured to enable the electronic ink display and disable the liquid crystal display when the monitoring unit detects that the remaining power is less than or equal to the first preset power threshold.

With reference to the fifth possible implementation manner of the fourth aspect, in a sixth possible implementation manner of the fourth aspect, the power-saving control policy further includes a second preset power threshold, and the second intelligent terminal further includes an instructing unit, where the instructing unit is configured to instruct a first processor to stop running, and instruct a second processor to process a task of the first processor when the monitoring unit detects that the remaining power is less than or equal to the second preset power threshold, where power consumption of the second processor is less than power consumption of the first processor.

With reference to the sixth possible implementation manner of the fourth aspect, in a seventh possible implementation manner of the fourth aspect, the second intelligent terminal further includes a matching unit and a migrating unit, where the acquiring unit is configured to acquire a first task executed by the first processor, the matching unit is configured to match the first task with a preset basic task list to obtain a second task, the migrating unit is configured to migrate the second task to the second processor, and the instructing unit is configured to instruct the first processor to stop running, and instruct the second processor to process the second task when the migrating unit migrates the second task to the second processor.

With reference to the seventh possible implementation manner of the fourth aspect, in an eighth possible implementation manner of the fourth aspect, the migrating unit is configured to migrate data of the second task from the first processor to the second processor, and the instructing unit is configured to instruct the first processor to enter a hibernation state, and instruct the second processor to process the second task when the migrating unit migrates the data of the second task from the first processor to the second processor.

A fifth aspect of an embodiment of the present disclosure discloses an intelligent terminal, where the intelligent terminal is a first intelligent terminal, and the first intelligent terminal includes a connecting unit configured to establish a connection with a second intelligent terminal, an acquiring unit configured to acquire an interval for enabling a communications module of the second intelligent terminal, a determining unit configured to determine a state of the communications module of the second intelligent terminal according to the interval for enabling the communications module, a storage unit configured to store, by the first intelligent terminal, a message that needs to be sent to the second intelligent terminal when the communications module of the second intelligent terminal is in a disabled state, and a sending unit configured to send, to the second intelligent terminal by the first intelligent terminal, the stored message that needs to be sent to the second intelligent terminal when the communications module of the second intelligent terminal is in an enabled state.

With reference to the fifth aspect, in a first possible implementation manner of the fifth aspect, the first intelligent terminal further includes a receiving unit, the receiving unit is configured to receive a message acquiring request sent by the second terminal, and that the sending unit is configured to send the stored message that needs to be sent to the second intelligent terminal includes sending, to the second intelligent terminal by the first intelligent terminal according to the request, the stored message that needs to be sent to the second intelligent terminal.

A sixth aspect of an embodiment of the present disclosure discloses an intelligent terminal, where the intelligent terminal includes an acquiring unit configured to acquire a power-saving control policy, where the power-saving control policy includes a first preset power threshold, a monitoring unit configured to monitor remaining power, and a switching unit configured to enable an electronic ink display and disable a liquid crystal display when the monitoring unit detects that the remaining power is less than or equal to the first preset power threshold.

With reference to the sixth aspect, in a first possible implementation manner of the sixth aspect, the power-saving control policy further includes a second preset power threshold, and the intelligent terminal further includes an instructing unit, where the instructing unit is configured to instruct a first processor to stop running, and instruct a second processor to process a task of the first processor when the monitoring unit detects that the remaining power is less than or equal to the second preset power threshold, where power consumption of the second processor is less than power consumption of the first processor.

With reference to the first possible implementation manner of the sixth aspect, in a second possible implementation manner of the sixth aspect, the second processor is an embedded single-chip microcomputer.

With reference to the first possible implementation manner of the sixth aspect or the second possible implementation manner of the sixth aspect, in a third possible implementation manner of the sixth aspect, the intelligent terminal further includes a matching unit and a migrating unit; the acquiring unit is configured to acquire a first task executed by the first processor, the matching unit is configured to match the first task with a preset basic task list to obtain a second task, the migrating unit is configured to migrate the second task to the second processor, and the instructing unit is configured to instruct the first processor to stop running, and instruct the second processor to process the second task when the migrating unit migrates the second task to the second processor.

With reference to the third possible implementation manner of the sixth aspect, in a fourth possible implementation manner of the sixth aspect, the migrating unit is configured to migrate data of the second task from the first processor to the second processor; and the instructing unit is configured to instruct the first processor to enter a hibernation state, and instruct the second processor to process the second task when the migrating unit migrates the data of the second task from the first processor to the second processor.

With reference to the first aspect and the fourth aspect, it can be learned that by using the intelligent terminal power-saving management method and apparatus that are provided in the embodiments of the present disclosure, a power-saving control policy is acquired, where the power-saving control policy includes an interval for enabling a communications module, duration is counted, and the communications module is enabled to perform communication when the duration is greater than or equal to the interval for enabling the communications module; and the communications module is disabled when the communication ends. Enabling and disabling of the communications module is periodically controlled, which saves power and extends usage time of an intelligent terminal in a case in which normal use of the intelligent terminal is ensured, thereby enhancing user experience. Further, remaining power is monitored, and an electronic ink display is enabled and a liquid crystal display is disabled when the remaining power is less than or equal to a first preset power threshold. Due to larger power consumption of the liquid crystal display, a screen is switched and the electronic ink display is used when the remaining power is less than the first preset power threshold, which can effectively save power. Further, a first processor is instructed to stop running, and a second processor is instructed to process a task of the first processor when the remaining power is less than or equal to the second preset power threshold, where power consumption of the second processor is less than power consumption of the first processor; and therefore, power consumption may be reduced, usage time of the intelligent terminal is extended, and user experience is enhanced.

With reference to the second aspect and the fifth aspect, it can be learned that by using the intelligent terminal power-saving management method and apparatus that are provided in the embodiments of the present disclosure, after a connection is established with a second intelligent terminal, a temporarily stored message is pushed to the second intelligent terminal, so that the second intelligent terminal processes a message that is not processed during disabling of a communications module of the second intelligent terminal, thereby enabling the second intelligent terminal to keep normal running of a function in the case of power saving.

With reference to the third aspect and the sixth aspect, it can be learned that by using the intelligent terminal power-saving management method and apparatus that are provided in the embodiments of the present disclosure, remaining power is monitored, and it is determined, according to the remaining power, whether to switch a screen of an intelligent terminal and whether to switch a processor, thereby reducing power consumption, extending standby time of the intelligent terminal, and enhancing user experience in a case in which normal running of a function is ensured.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
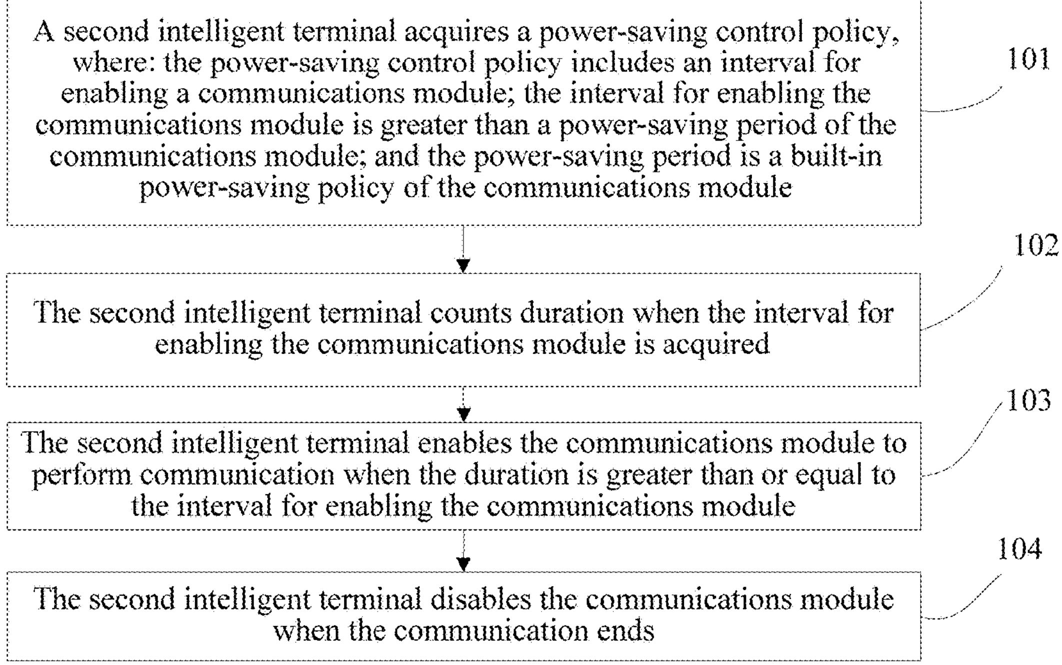
FIG. 1 is a flowchart of an intelligent terminal power-saving management method according to an embodiment of the present disclosure.

According to FIG. 1, the following describes an intelligent terminal power-saving management method according to an embodiment of the present disclosure. The method can ensure normal running of an intelligent terminal while saving power, extending usage time of the intelligent terminal, and enhancing user experience. The method includes steps 101 to 104.

101. A second intelligent terminal acquires a power-saving control policy, where the power-saving control policy includes an interval for enabling a communications module, the interval for enabling the communications module is greater than a power-saving period of the communications module, and the power-saving period is a built-in power-saving control policy of the communications module.

The power-saving control policy may be set by default by the intelligent terminal.

The interval for enabling the communications module may be set by default by the intelligent terminal, or may be set by the user according to a personal requirement. The interval may be at minute or hour level, for example, three minutes, ten minutes, one hour, or three hours.

The power-saving period of the communications module is generally at millisecond level.

The communications module includes cellular communication, a general packet radio service (GPRS), a third generation (3G), Long Term Evolution (LTE), Wi-Fi, Bluetooth®, or the like.

102. The second intelligent terminal counts duration when the interval for enabling the communications module is acquired.

Counting the duration may include starting a timer to count time, to obtain the duration, and determine whether the duration is equal to the interval for enabling the communications module.

103. Enable the communications module to perform communication when the duration is greater than or equal to the interval for enabling the communications module.

When the duration obtained by the timer is equal to the interval for enabling the communications module, it is time to enable the communications module; then the communications module can be enabled to receive a to-be-processed task and process the to-be-processed task.

Enabling the communications module includes: re-establishing a connection with a paired terminal, or re-accessing a Wi-Fi access point (AP); in the case of cellular communication, re-initiating a network access registration procedure is further required.

104. Disable the communications module when the communication ends.

When the to-be-processed task or a notification is processed, the communications module is disabled to save power of the intelligent terminal.

Optionally, the intelligent terminal may actually disable the communications module, so that the communications module does not work. For example, the communications module is disabled by turning off power supply, or signal strength of the communications module is adjusted to a minimum value, so that a peer end of communication cannot detect a signal of the intelligent terminal, and therefore disconnects from the intelligent terminal. Optionally, before the communications module is disabled, the intelligent terminal may disconnect from the peer end of communication, or initiate an offline or deregistration procedure.

Figure 2:
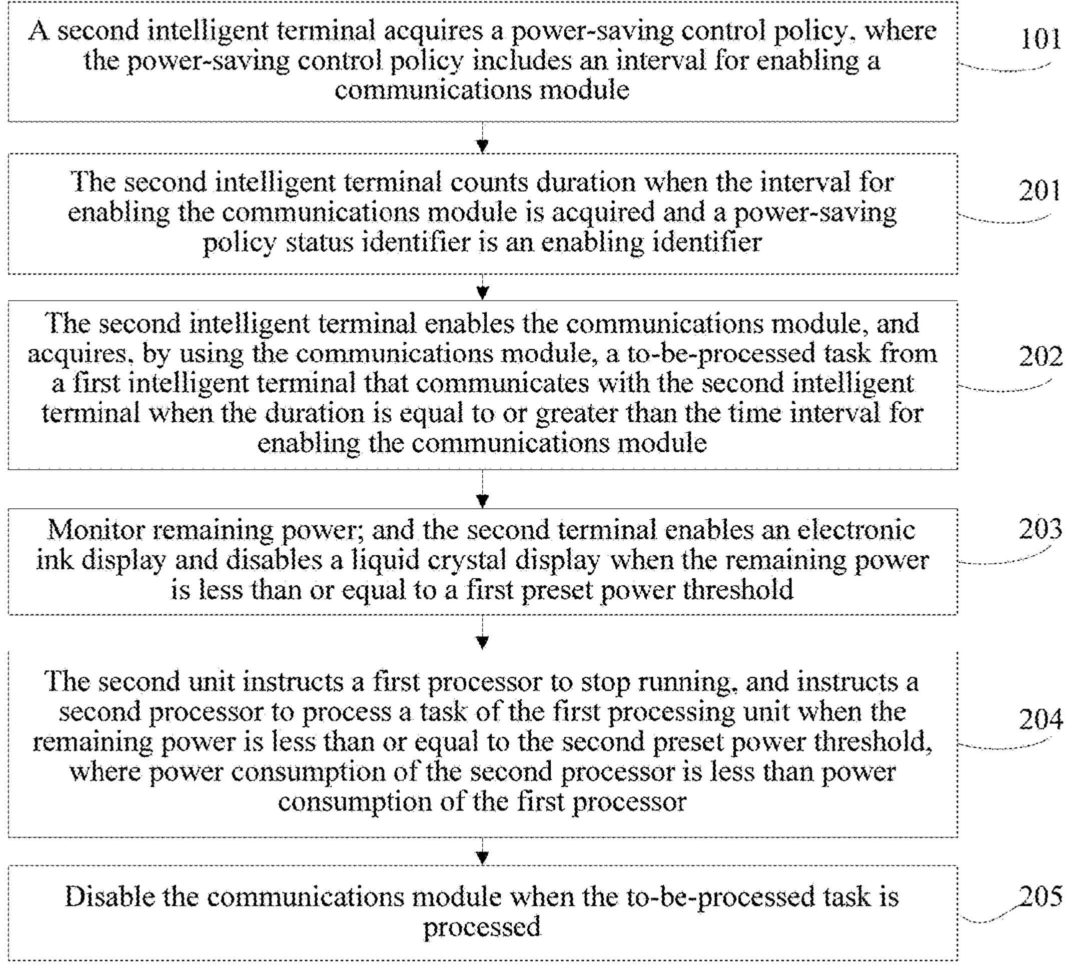
FIG. 2 is a flowchart of another intelligent terminal power-saving management method according to another embodiment of the present disclosure.

Optionally, as shown in FIG. 2, the power-saving control policy further includes a power-saving control policy status identifier.

The counting the duration includes step 201 as follows.

201. The second intelligent terminal counts the duration when the interval for enabling the communications module is acquired and the power-saving control policy status identifier is an enabling identifier.

Optionally, as shown in FIG. 2, the enabling, by the second terminal, the communications module to perform communication includes step 202 as follows.

202. The second intelligent terminal enables the communications module, and acquires, by using the communications module, a to-be-processed task from a first intelligent terminal that communicates with the second intelligent terminal.

The disabling, by the second terminal, the communications module when the communication ends includes step 205 as follows.

205. The second intelligent terminal disables the communications module when the to-be-processed task is processed.

Optionally, the to-be-processed task includes a type of a notification that needs to be queried; and the acquiring, by using the communications module, a to-be-processed task from a first intelligent terminal that communicates with the second intelligent terminal includes sending a query request to the first intelligent terminal, where the query request includes the type of the notification that needs to be queried, so that the first intelligent terminal acquires, from a cache, a notification that matches the type of the notification that needs to be queried; and receiving a notification sent by the peer end.

That the second terminal disables the communications module when the to-be-processed task is processed includes disabling, by the second terminal, the communications module when the received notification is processed.

Optionally, the to-be-processed task includes a type of a notification that needs to be queried.

The acquiring, by using the communications module, a to-be-processed task from a first intelligent terminal that communicates with the second intelligent terminal includes receiving, by using the communications module, a notification pushed by the first intelligent terminal that communicates with the second intelligent terminal, where the notification is a message notification to which the intelligent terminal subscribes.

That the second intelligent terminal disables the communications module when the to-be-processed task is processed includes disabling, by the second intelligent terminal, the communications module when the notification is processed.

The notification includes a missed call, information, various pushed messages, or the like.

Optionally, as shown in FIG. 2, the power-saving control policy further includes a first preset power threshold, and the second intelligent terminal includes an ink display and a liquid crystal display.

When the power-saving control policy status identifier is an enabling identifier, the method further includes step 203 as follows.

203. The second intelligent terminal monitors remaining power. The second intelligent terminal enables the electronic ink display and disables the liquid crystal display when the remaining power is less than or equal to the first preset power threshold.

The second intelligent terminal is used to perform display switching between the electronic ink display and the liquid crystal display, and a switching criterion may be determined according to current remaining power of the intelligent terminal. Due to larger power consumption of the liquid crystal display, a screen is switched and the electronic ink display is used when the remaining power is less than the first preset power threshold, which can effectively save power.

Optionally, as shown in FIG. 2, the power-saving control policy further includes a second preset power threshold.

After the monitoring remaining power, the method further includes step 204 as follows.

204. Instruct a first processor to stop running, and instruct a second processor to process a task of the first processor when the remaining power is less than or equal to the second preset power threshold, where power consumption of the second processor is less than power consumption of the first processor.

The first processor is called a main processor or an application processor, which is configured to run an operating system and application software of the intelligent terminal. The second processor is an embedded single-chip microcomputer with low performance and low power consumption, which may be configured to monitor or manage various sensors (such as acceleration sensors and gravity sensors), and may perform preliminary data processing. For example, when the first processor is disabled, the second processor runs a timer, calendar software, and the like of the intelligent terminal.

Optionally, as shown in FIG. 2, before the instructing a first processor to stop running, the method further includes the following steps.

The second intelligent terminal acquires a first task executed by the first processor.

The second intelligent terminal matches the first task with a preset basic task list to obtain a second task.

The second intelligent terminal migrates the second task to the second processor for processing.

The preset basic task list includes a clock, a calendar, weather forecast, and the like.

The matching the first task with a preset basic task list to obtain a second task includes: forming the second task by a task both belonging to the first task and belonging to the preset basic task list.

Optionally, as shown in FIG. 2, that the second intelligent terminal migrates the second task to the second processor for processing includes migrating, by the second intelligent terminal, data of the second task from the first processor to the second processor, and instructing the first processor to enter a hibernation state.

The instructing a first processor to stop running includes: instructing the first processor to enter the hibernation state or powering off the first processor.

It can be learned from the foregoing description that by using the intelligent terminal power-saving management method provided in this embodiment of the present disclosure, enabling and disabling of a communications module are periodically controlled, which saves power and extends usage time of an intelligent terminal in a case in which normal use of the intelligent terminal is ensured. Further, screen switching and processor switching are performed by monitoring remaining power, which also saves power, extends usage time of the intelligent terminal, and enhances user experience.

Figure 3:
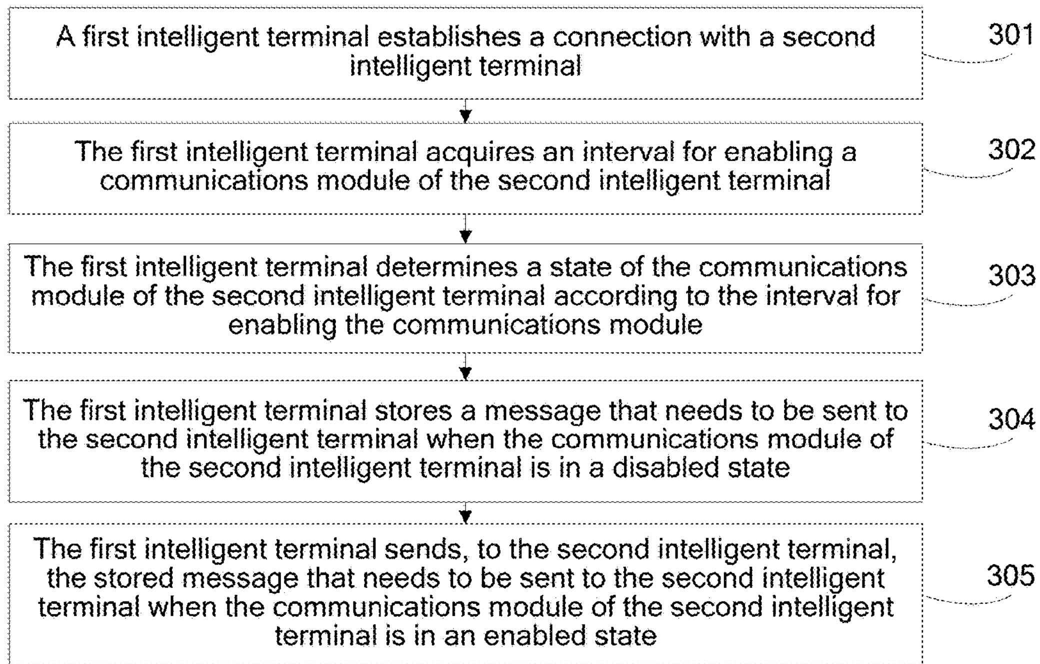
FIG. 3 is a flowchart of another intelligent terminal power-saving management method according to another embodiment of the present disclosure.

In an embodiment of the present disclosure, as shown in FIG. 3, FIG. 3 is a flowchart of an intelligent terminal power-saving management method, including steps 301 to 305.

301. A first intelligent terminal establishes a connection with a second intelligent terminal.

The first intelligent terminal and the second intelligent terminal establish a connection in a case in which communications modules of the two intelligent terminals are enabled. The communications modules include cellular communication, GPRS, 3G, LTE, Wi-Fi, Bluetooth®, or the like.

302. The first intelligent terminal acquires an interval for enabling the communications module of the second intelligent terminal.

The communications module of the second intelligent terminal is enabled at an interval, for example, every five minutes or every three minutes, which may be configured by a user according to a personal requirement, or may be set according to a default setting of the second intelligent terminal.

303. The first intelligent terminal determines a state of the communications module of the second intelligent terminal according to the interval for enabling the communications module.

In an embodiment of the present disclosure, after establishing the connection with the second intelligent terminal, the first intelligent terminal acquires the interval for enabling the communications module of the second intelligent terminal. The first intelligent terminal can determine the state of the communications module of the second intelligent terminal, for example, an enabled state or a disabled state, at any time point according to a time point at which the connection is established with the second intelligent terminal and the interval for enabling the communications module of the second intelligent terminal.

304. The first intelligent terminal stores a message that needs to be sent to the second intelligent terminal when the communications module of the second intelligent terminal is in a disabled state.

In this embodiment of the present disclosure, the first intelligent terminal may be a smartphone, and the second intelligent terminal may be a wearable watch. When a communications module of the wearable watch is in a disabled state, the smartphone serves as a peer end that is connected to the wearable watch. The smartphone may store a message to be sent to the smart watch. For example, the smartphone may store the message in a database, or temporarily store the message in a memory; and a storage manner is not limited herein.

305. The first intelligent terminal sends, to the second intelligent terminal, the stored message that needs to be sent to the second intelligent terminal when the communications module of the second intelligent terminal is in an enabled state.

In another embodiment of the present disclosure, the first intelligent terminal may be a smartphone, and the second intelligent terminal may be a wearable watch. When a communications module of the wearable watch is in an enabled state, the smartphone serves as a peer end that is connected to the wearable watch, and the smartphone may send a message to the wearable watch. The message is a message stored by the smartphone when the communications module of the wearable watch is in a disabled state, and needs to be sent to the wearable watch.

Optionally, as shown in FIG. 3, before that the first intelligent terminal sends, to the second intelligent terminal, the stored message that needs to be sent to the second intelligent terminal, the method further includes receiving, by the first intelligent terminal, a message acquiring request sent by the second terminal.

That the first intelligent terminal sends, to the second intelligent terminal, the stored message that needs to be sent to the second intelligent terminal includes sending, to the second intelligent terminal by the first intelligent terminal according to the request, the stored message that needs to be sent to the second intelligent terminal.

It can be learned from the foregoing description that by using the technical solution provided in this embodiment of the present disclosure, after a connection is established with a second intelligent terminal, a temporarily stored message is pushed to the second intelligent terminal, so that the second intelligent terminal processes a message that is not processed during disabling of a communications module, thereby enabling the second intelligent terminal to keep normal running of a function in the case of power saving.

Figure 4:
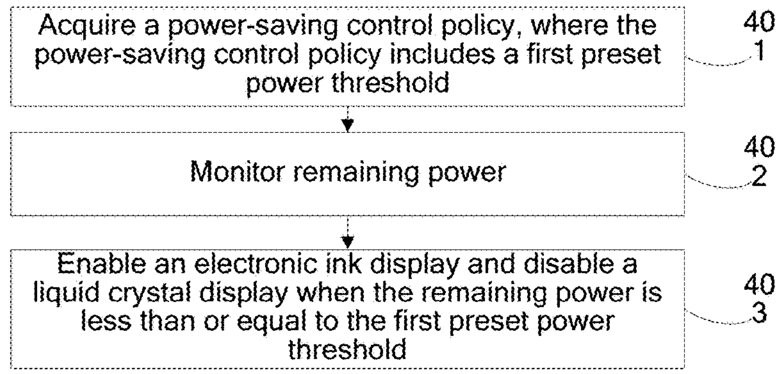
FIG. 4 is a flowchart of another intelligent terminal power-saving management method according to another embodiment of the present disclosure.

In an embodiment of the present disclosure, as shown in FIG. 4, FIG. 4 is a flowchart of an intelligent terminal power-saving management method, including steps 401 to 405.

401. Acquire a power-saving control policy, where the power-saving control policy includes a first preset power threshold.

The power-saving control policy is configured by a user, or may be set by default by an intelligent terminal.

402. Monitor remaining power.

The intelligent terminal may monitor the remaining power of the intelligent terminal in real time, or may monitor the remaining power of the intelligent terminal according to a preset interval.

403. Enable an electronic ink display and disable a liquid crystal display when the remaining power is less than or equal to the first preset power threshold.

The electronic ink display is more power-saving than the liquid crystal display.

Optionally, the power-saving control policy further includes a second preset power threshold.

After the monitoring remaining power, the method further includes instructing a first processor to stop running, and instructing a second processor to process a task of the first processor when the remaining power is less than or equal to the second preset power threshold, where power consumption of the second processor is less than power consumption of the first processor.

Optionally, the second processor is an embedded single-chip microcomputer.

Optionally, before the instructing a first processor to stop running, the method further includes acquiring a first task executed by the first processor, matching the first task with a preset basic task list to obtain a second task, and migrating the second task to the second processor.

Optionally, the migrating the second task to the second processor includes migrating data of the second task from the first processor to the second processor.

The instructing a first processor to stop running includes instructing the first processor to enter a hibernation state.

It can be learned from the foregoing description that by using the embodiment provided in the present disclosure, remaining power is monitored, and it is determined, according to the remaining power, whether to switch a screen of an intelligent terminal and whether to switch a processor, thereby reducing power consumption, extending standby time of the intelligent terminal, and enhancing user experience in a case in which normal running of a function is ensured.

Figure 5:
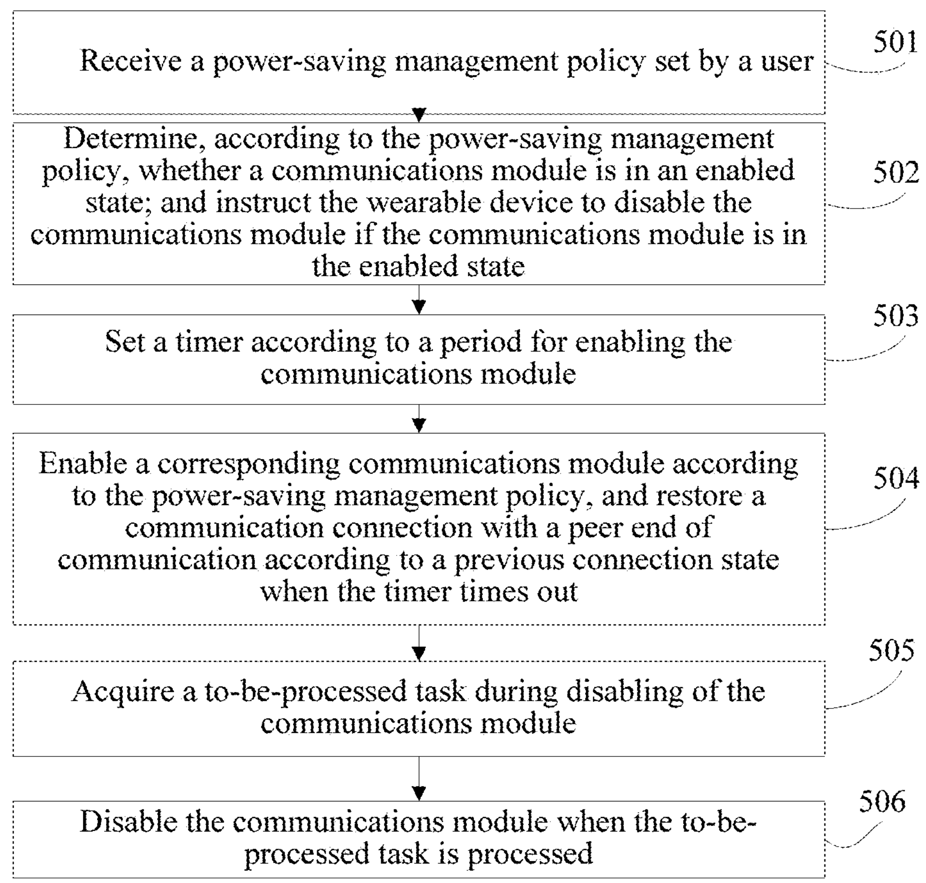
FIG. 5 is a flowchart of another intelligent terminal power-saving management method according to another embodiment of the present disclosure.

In an embodiment of the present disclosure, as shown in FIG. 5, FIG. 5 describes a working procedure of periodically enabling a communications module by a wearable device according to configuration information of a user.

501. Receive a power-saving management policy set by the user, where the power-saving management policy includes whether to periodically enable the communications module and a period for enabling the communications module, whether to enable cellular communication, whether to enable Wi-Fi, whether to enable Bluetooth®, or the like.

502. Determine, according to the power-saving management policy, whether the communications module is in an enabled state; and instruct the wearable device to disable the communications module if the communications module is in the enabled state.

Optionally, the wearable device may actually disable the communications module, so that the communications module does not work. For example, the communications module is disabled by turning off power supply, or signal strength of the communications module is adjusted to a minimum value, so that a peer end of communication cannot detect a signal of the wearable device, and therefore disconnects from the wearable device. Optionally, before the communications module is disabled, the wearable device may disconnect from the peer end of communication, or initiate an offline or deregistration procedure.

503. Set a timer according to the period for enabling the communications module.

504. Enable a corresponding communications module according to the power-saving management policy, and restore a communication connection with a peer end of communication according to a previous connection state when the timer times out. For example, a connection is re-established with a paired terminal, or Wi-Fi is re-accessed; in the case of cellular communication, re-initiating a network access registration procedure is further required.

505. Acquire a to-be-processed task during disabling of the communications module, for example, a missed call notification, a short message service (SMS) message, an important notification, or the like; where the important notification may be of a user-defined notification type, for example, a WeChat message of a person, subscribed important stock information, or an important email.

506. Disable the communications module when the to-be-processed task is processed.

It can be learned from the foregoing description that by using the technical solution provided in the present disclosure, a communications module is periodically enabled according to a power-saving management policy, which can ensure normal working of a wearable device, while extending working time and enhancing user experience.

Figure 6:
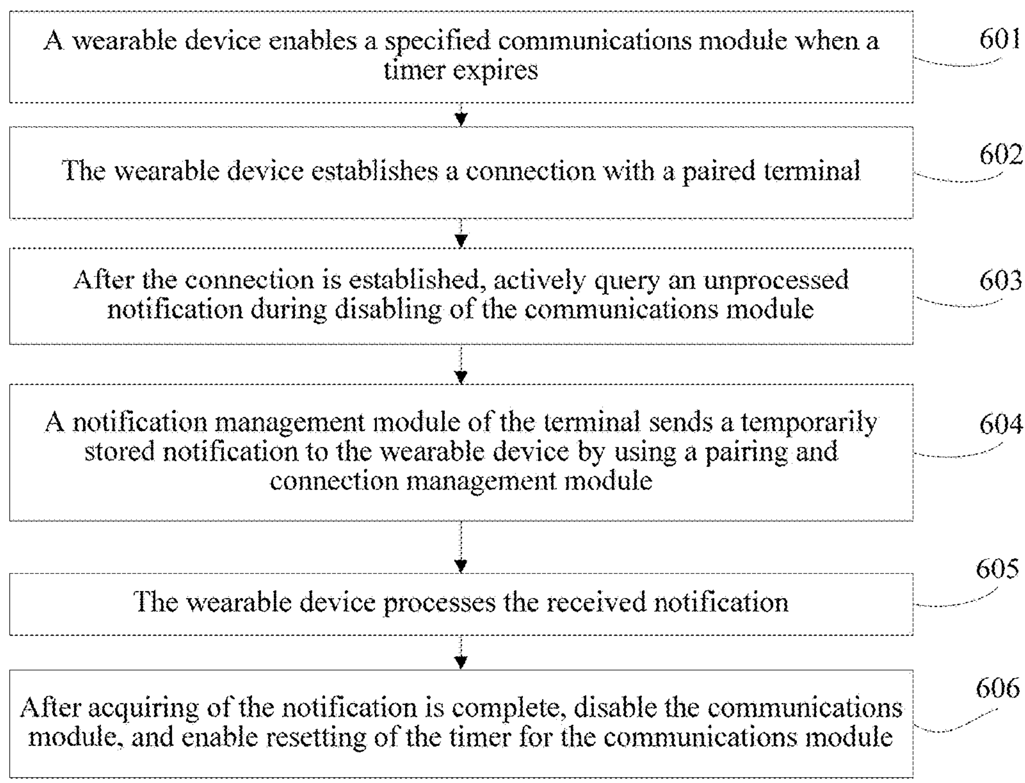
FIG. 6 is a flowchart of another intelligent terminal power-saving management method according to another embodiment of the present disclosure.

In another embodiment of the present disclosure, as shown in FIG. 6, FIG. 6 describes a method for acquiring an unprocessed notification by a wearable device.

Step 601: The wearable device enables a specified communications module when a timer expires.

The specified communications module may be at least one of the following: a cellular network, a 3G network, LTE, GPRS, Wi-Fi, and Bluetooth®.

The wearable device may be a wearable watch, a wearable bracelet, wearable glasses, or the like.

Step 602: The wearable device establishes a connection with a paired terminal.

The paired terminal may be an intelligent device such as a smartphone or a tablet computer.

Step 603: After the connection is established, actively query an unprocessed notification during disabling of the communications module.

A query request may be actively sent to a peer end, where the query request includes a type of an unprocessed notification that needs to be queried.

The wearable device may also wait for the peer end to actively push an unprocessed notification.

Step 604: A notification management module of the terminal sends a temporarily stored notification to the wearable device by using a pairing and connection management module.

Step 605: The wearable device processes the received notification. For example, the wearable device notifies a user of a missed call, a missed SMS message, or the like. Optionally, a display in an electronic mode may be used to display the notification, and a liquid crystal display may also be used to display the notification.

Step 606: After acquiring of the notification is complete, disable the communications module, and enable resetting of the timer for the communications module.

Optionally, the wearable device actively disconnects from the terminal.

Optionally, it is supported that a mobile phone actively pushes an unprocessed notification, that is, after the wearable device periodically enables the communications module, and establishes a connection with the terminal, the terminal actively pushes an important notification to the wearable device.

Optionally, it is supported that the wearable device subscribes to an offline notification from the paired terminal, so that after a wireless module is periodically enabled and a connection is established, the wearable device only needs to acquire the notification that is subscribed to.

Because the terminal and the wearable device are close, a connection is generally established in a short-distance manner, for example, Wi-Fi or Bluetooth®.

Optionally, it is also supported that the wearable device connects to a cellular base station or a Wi-Fi AP by means of cellular communication or Wi-Fi, and accesses a packet network or the Internet.

It can be learned from the foregoing description that by using the technical solution provided in this embodiment of the present disclosure, a wearable device periodically enables a communications module, and actively queries an unprocessed notification from a paired terminal, which ensures normal running of a communication function while saving power and extending working time of the wearable device.

Figure 7:
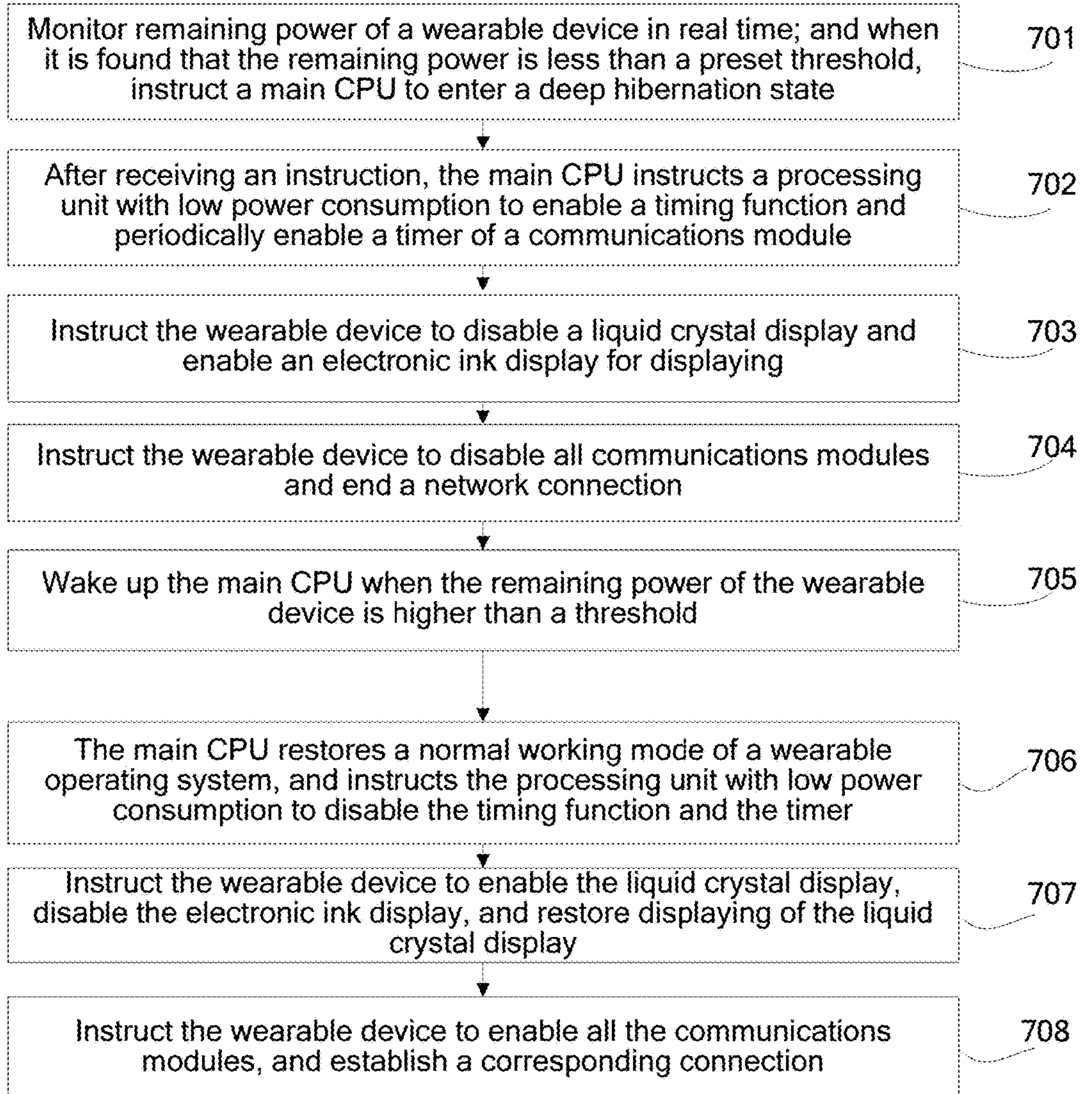
FIG. 7 is a flowchart of another intelligent terminal power-saving management method according to another embodiment of the present disclosure.

In another embodiment of the present disclosure, as shown in FIG. 7, FIG. 7 describes a wearable device power-saving management method, where the method includes:

Step 701: Monitor remaining power of the wearable device in real time; and when it is found that the remaining power is less than a preset threshold, instruct a main central processing unit (CPU) to enter a deep hibernation state.

Step 702: After receiving an instruction, the main CPU instructs a processor with low power consumption to enable a timing function and periodically enable a timer of a communications module. After ensuring that the main CPU has entered the deep hibernation state, the wearable device still has a timing function of a watch, and can periodically and habitually acquire an important notification required by a user.

Step 703: Instruct the wearable device to disable a liquid crystal display and enable an electronic ink display for displaying.

Step 704: Instruct the wearable device to disable all communications modules and end a network connection.

In this case, the wearable watch becomes an electronic watch that runs on the processor with low power consumption, uses the electronic ink display to display time, and does not have a communication function. It is only supported that an important notification is displayed in a longer period. Optionally, periodically enabling a function of the communications module may also be disabled; and the communications module is enabled to acquire an important notification only when the remaining power is greater than a threshold. After the foregoing operations are complete, the main CPU enters the deep hibernation state.

Step 705: Wake up the main CPU when the remaining power of the wearable device is higher than a threshold.

Step 706: The main CPU restores a normal working mode of a wearable operating system, and instructs the processor with low power consumption to disable the timing function and the timer.

Step 707: Instruct the wearable device to enable the liquid crystal display, disable the electronic ink display, and restore displaying of the liquid crystal display.

Step 708: Instruct the wearable device to enable all the communications modules, and establish a corresponding connection.

In this case, the wearable device has many functions of an intelligent watch and a communication function, and can run various application programs.

Figure 8:
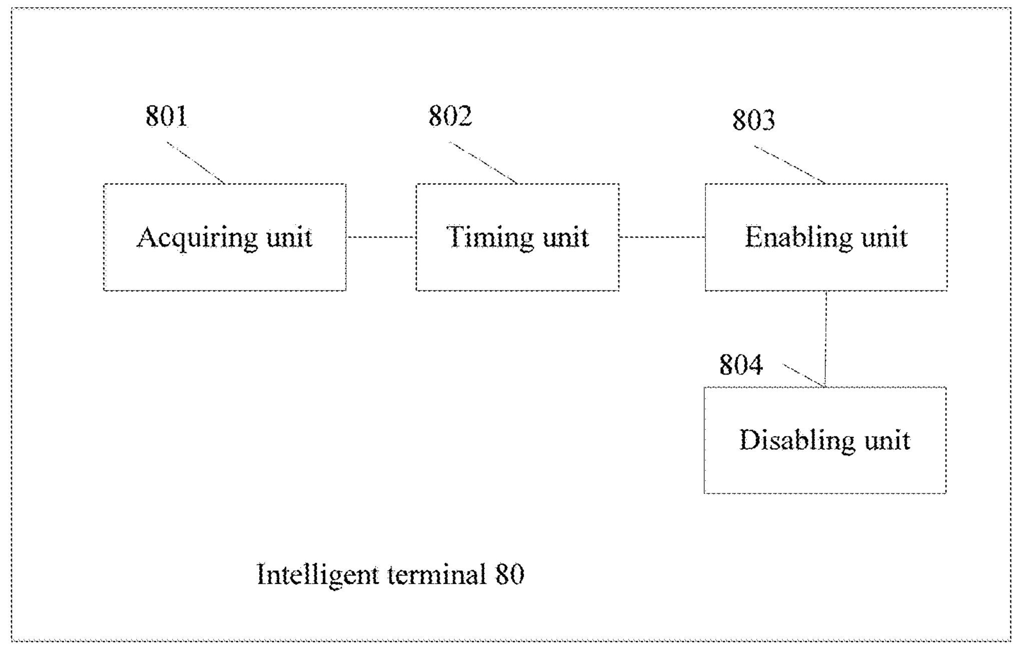
FIG. 8 is a structural diagram of an intelligent terminal according to another embodiment of the present disclosure.

In an embodiment of the present disclosure, as shown in FIG. 8, FIG. 8 is a structural diagram of an intelligent terminal 80, where the intelligent terminal 80 may be a wearable device, a smartphone, a tablet computer, or the like. The wearable device may be a wearable bracelet, wearable glasses, a wearable ring, a wearable watch, or the like.

The intelligent terminal 80 is a second intelligent terminal, and the second intelligent terminal includes an acquiring unit 801, a timing unit 802, an enabling unit 803, and a disabling unit 804.

The acquiring unit 801 is configured to acquire a power-saving control policy, where the power-saving control policy includes an interval for enabling a communications module, the interval for enabling the communications module is greater than a power-saving period of the communications module, and the power-saving period is a built-in power-saving control policy of the communications module.

Types of the communications module may include a cellular mobile network, GPRS, a 3G network, LTE, Wi-Fi, Bluetooth®, and the like.

The timing unit 802 is configured to count duration when the acquiring unit 801 acquires the interval for enabling the communications module.

The enabling unit 803 is configured to enable the communications module to perform communication when the duration obtained by the timing unit 802 is greater than or equal to the interval for enabling the communications module.

The disabling unit 804 is configured to disable the communications module when the communication ends.

Optionally, in an embodiment of the present disclosure, the enabling unit 803 is configured to enable the communications module, and acquire, by using the communications module, a to-be-processed task from a first intelligent terminal that communicates with the second intelligent terminal.

The disabling unit 804 is configured to disable the communications module when the to-be-processed task is processed.

The enabling unit 803 includes a request subunit 8031 and a first receiving subunit 8032.

The request subunit 8031 is configured to send a query request to the first intelligent terminal, where the query request includes a type of a notification that needs to be queried, so that the first intelligent terminal acquires, from a cache, a notification that matches the type of the notification that needs to be queried.

The first receiving subunit 8032 is configured to receive a notification sent by the peer end.

The disabling unit 804 is configured to disable the communications module when the received notification is processed.

Optionally, in another embodiment of the present disclosure, the enabling unit 803 includes a second receiving subunit 8033.

The second receiving subunit 8033 is configured to receive, by using the communications module, a notification pushed by the first intelligent terminal that communicates with the second intelligent terminal, where the notification is a message notification to which the second intelligent terminal subscribes.

The disabling unit is configured to disable the communications module when the notification is processed.

Optionally, in another embodiment of the present disclosure, the power-saving control policy further includes a power-saving control policy status identifier.

The timing unit 802 is configured to count the duration when the acquiring unit 801 acquires the interval for enabling the communications module and the power-saving control policy status identifier is an enabling identifier.

Figure 9:
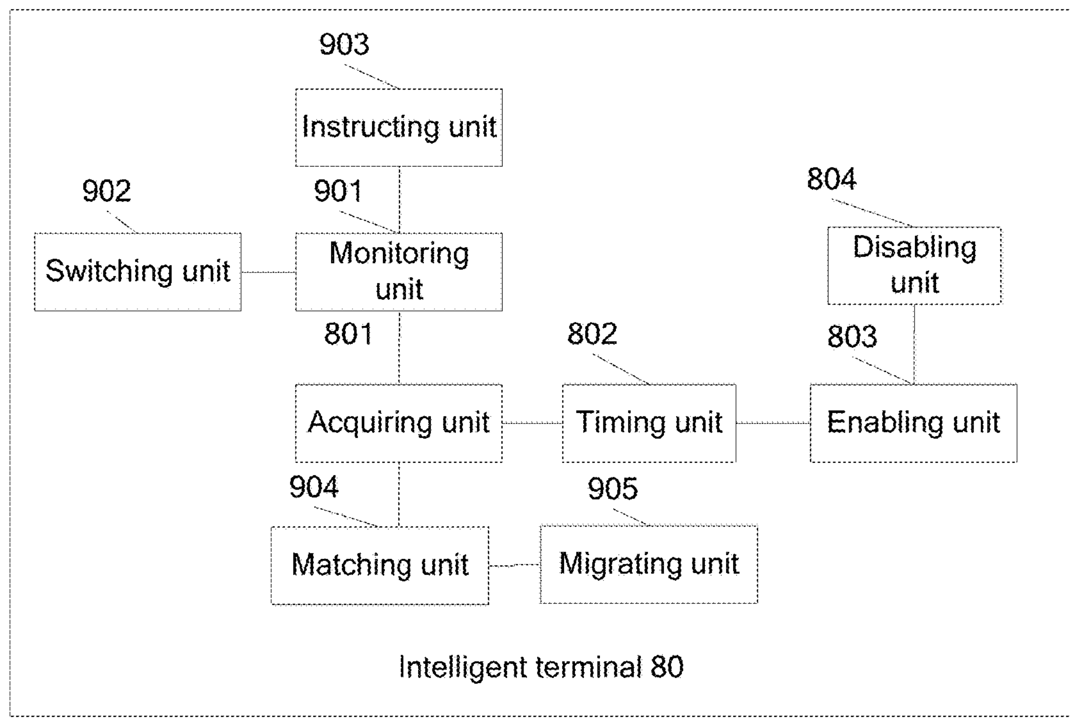
FIG. 9 is a structural diagram of another intelligent terminal according to another embodiment of the present disclosure.

In another embodiment of the present disclosure and with reference to FIG. 9, the power-saving control policy further includes a first preset power threshold, and the second intelligent terminal includes an ink display and a liquid crystal display.

The intelligent terminal further includes a monitoring unit 901 and a switching unit 902.

The monitoring unit 901 is configured to monitor remaining power when the power-saving control policy status identifier acquired by the acquiring unit 801 is an enabling identifier.

The switching unit 902 is configured to enable the communications module to perform communication when the monitoring unit 901 detects that the remaining power is less than or equal to the first preset power threshold.

Optionally, in another embodiment of the present disclosure, the power-saving control policy further includes a second preset power threshold.

The intelligent terminal further includes an instructing unit 903.

The instructing unit 903 is configured to instruct a first processor to stop running, and instruct a second processor to process a task of the first processor when the monitoring unit 901 detects that the remaining power is less than or equal to the second preset power threshold, where power consumption of the second processor is less than power consumption of the first processor.

Optionally, the second processor may be an embedded single-chip microcomputer, and the first processor may be a central processing unit.

Optionally, in another embodiment of the present disclosure, the intelligent terminal further includes a matching unit 904 and a migrating unit 905.

The acquiring unit 801 is configured to acquire a first task executed by the first processor.

The matching unit 904 is configured to match the first task with a preset basic task list to obtain a second task.

The migrating unit 905 is configured to migrate the second task to the second processor.

The instructing unit 903 is configured to instruct the first processor to stop running, and instruct the second processor to process the second task when the migrating unit 905 migrates the second task to the second processor.

The migrating unit 905 is configured to migrate data of the second task from the first processor to the second processor.

The instructing unit 903 is configured to instruct the first processor to enter a hibernation state, and instruct the second processor to process the second task when the migrating unit 905 migrates the data of the second task from the first processor to the second processor.

It can be learned from the foregoing description that by using the intelligent terminal provided in the present disclosure, enabling and disabling of a communications module of the intelligent terminal are periodically controlled, which saves power and extends usage time of the intelligent terminal in a case in which normal use of the intelligent terminal is ensured. Further, screen switching and processor switching are performed by monitoring remaining power, which also saves power, extends usage time of the intelligent terminal, and enhances user experience.

Figure 10:
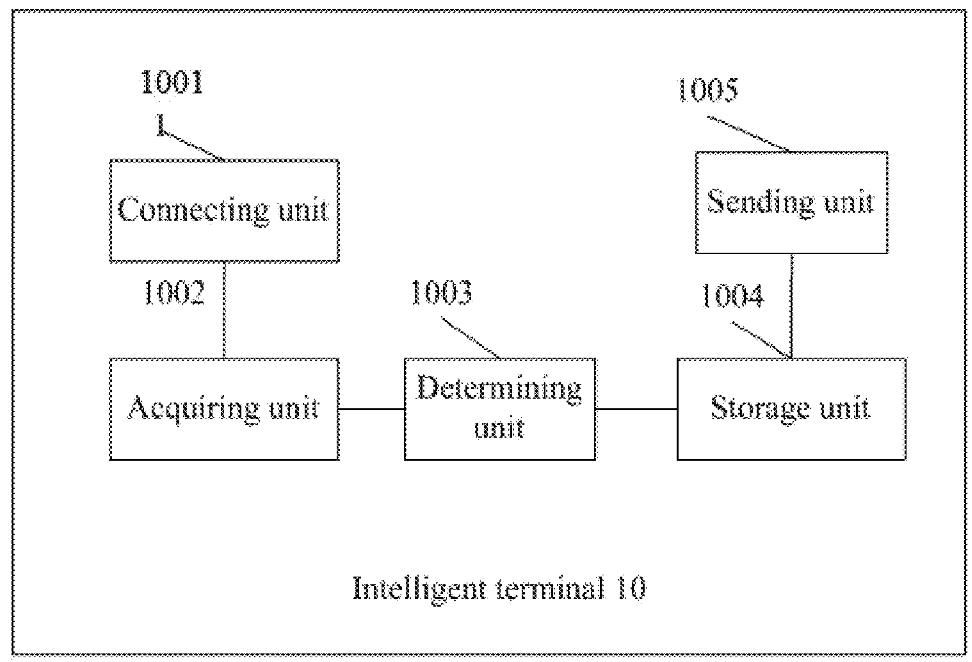
FIG. 10 is a structural diagram of another intelligent terminal according to another embodiment of the present disclosure.

Optionally, in an embodiment of the present disclosure, as shown in FIG. 10, FIG. 10 describes an intelligent terminal, where the intelligent terminal is a first intelligent terminal, and the first intelligent terminal includes a connecting unit 1001 configured to establish a connection with a second intelligent terminal, where connection with the second intelligent terminal may be performed in a manner such as WIFI, Bluetooth®, a 3G network, LTE, or a GPRS network, the first intelligent terminal may be a wearable device, and the second intelligent terminal may be a device such as a smartphone, an acquiring unit 1002 configured to acquire an interval for enabling a communications module of the second intelligent terminal, where the acquiring unit 1002 may actively acquire the interval for enabling the communications module of the second intelligent terminal, or may directly receive the interval for enabling the communications module sent by the second intelligent terminal, a determining unit 1003 configured to determine a state of the communications module of the second intelligent terminal according to the interval for enabling the communications module, where in an embodiment of the present disclosure, after the connection is established with the second intelligent terminal, the interval for enabling the communications module of the second intelligent terminal is acquired, and the determining unit 1003 may determine the state of the communications module of the second intelligent terminal, for example, an enabled state or a disabled state, at any time point according to a time point at which the connection is established with the second intelligent terminal and the interval for enabling the communications module of the second intelligent terminal, a storage unit 1004 configured to store a message that needs to be sent to the second intelligent terminal when the communications module of the second intelligent terminal is in a disabled state, where the message may be stored in a database, or may be temporarily stored in a memory, which is not limited herein, and a sending unit 1005 configured to send, to the second intelligent terminal by the first intelligent terminal, the stored message that needs to be sent to the second intelligent terminal when the communications module of the second intelligent terminal is in an enabled state.

Optionally, in an embodiment of the present disclosure, the first intelligent terminal further includes a receiving unit 1006.

The receiving unit 1006 is configured to receive a message acquiring request sent by the second terminal.

The sending unit 1005 is configured to send, to the second intelligent terminal by the first intelligent terminal according to the request, the stored message that needs to be sent to the second intelligent terminal when the communications module of the second intelligent terminal is in the enabled state.

Figure 11:
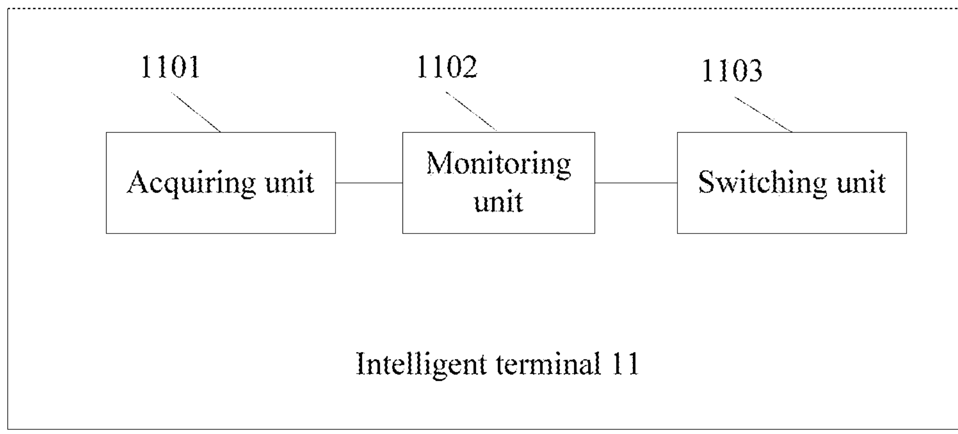
FIG. 11 is a structural diagram of another intelligent terminal according to another embodiment of the present disclosure.

As shown in FIG. 11, FIG. 11 is a structural diagram of an intelligent terminal 11, where the intelligent terminal 11 includes an acquiring unit 1101 configured to acquire a power-saving control policy, where the power-saving control policy includes a first preset power threshold, a monitoring unit 1102 configured to monitor remaining power, and a switching unit 1103 configured to enable an electronic ink display and disable a liquid crystal display when the monitoring unit detects that the remaining power is less than or equal to the first preset power threshold.

Figure 12:
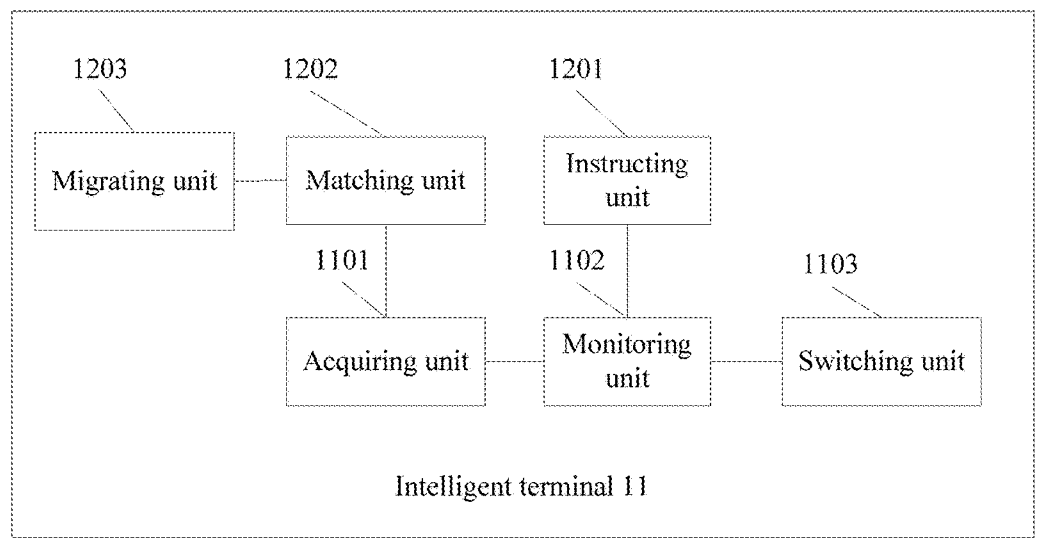
FIG. 12 is a structural diagram of another intelligent terminal according to another embodiment of the present disclosure.

Optionally, as shown in FIG. 12, the power-saving control policy further includes a second preset power threshold.

The intelligent terminal further includes an instructing unit 1201.

The instructing unit 1201 is configured to instruct a first processor to stop running, and instruct a second processor to process a task of the first processor when the monitoring unit 1102 detects that the remaining power is less than or equal to the second preset power threshold, where power consumption of the second processor is less than power consumption of the first processor.

Optionally, the second processor is an embedded single-chip microcomputer.

Optionally, the intelligent terminal further includes a matching unit 1202 and a migrating unit 1203.

The acquiring unit 1101 is configured to acquire a first task executed by the first processor.

The matching unit 1202 is configured to match the first task with a preset basic task list to obtain a second task.

The migrating unit 1203 is configured to migrate the second task to the second processor.

The instructing unit 1201 is configured to instruct the first processor to stop running, and instruct the second processor to process the second task when the migrating unit 1203 migrates the second task to the second processor.

Optionally, in an embodiment of the present disclosure, the migrating unit 1203 is configured to migrate data of the second task from the first processor to the second processor.

The instructing unit 1201 is configured to instruct the first processor to enter a hibernation state, and instruct the second processor to process the second task when the migrating unit migrates the data of the second task from the first processor to the second processor.

Figure 13:
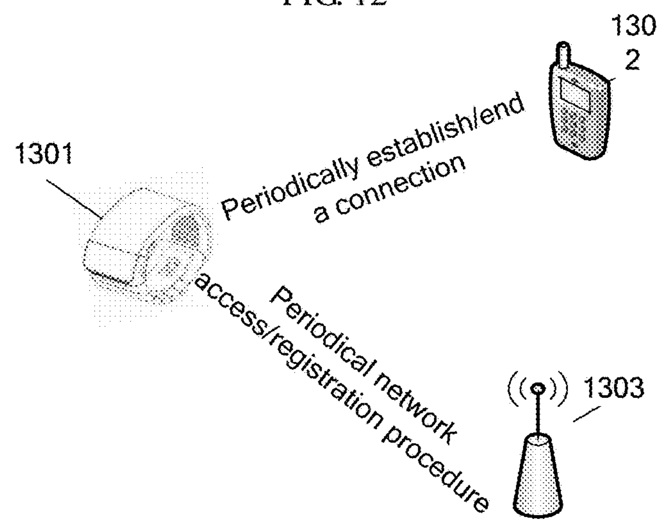
FIG. 13 is a structural diagram of another intelligent terminal according to another embodiment of the present disclosure.

In another embodiment of the present disclosure, as shown in FIG. 13, FIG. 13 describes a process during which a wearable device using a power-saving management policy interacts with another device.

The wearable device 1301 is the wearable device, which has one or more wireless communications modules, and may establish a communication connection with at least one paired terminal 1302 (for example, a mobile phone or a tablet computer) to acquire data; or may establish a connection with a wireless access point 1303 such as a base station or a Wi-Fi AP, and access a network. In addition, it is supported that a communications module is periodically enabled or disabled according to a time at which the communications module is enabled or disabled, and establishing a connection with/disconnecting from a peer end of communication is triggered.

1302 is an intelligent terminal (for example, a smartphone or a tablet computer), which supports connection and communication with the paired wearable device. When the wearable device disables the communications module, the intelligent terminal temporarily stores an offline message and a notification of the wearable device. After the wearable device is associated with the intelligent terminal, the intelligent terminal sends an important offline notification to the wearable device, which supports two manners, that is, an active manner and a passive manner.

1303 is the wireless access point, and supports that the wearable device connects to and accesses a network. After the wearable device disables the communications module, a network side temporarily stores the offline message and the notification of the wearable device. After the wearable device accesses the network, the network side may forward the offline notification to the wearable device.

Figure 14:
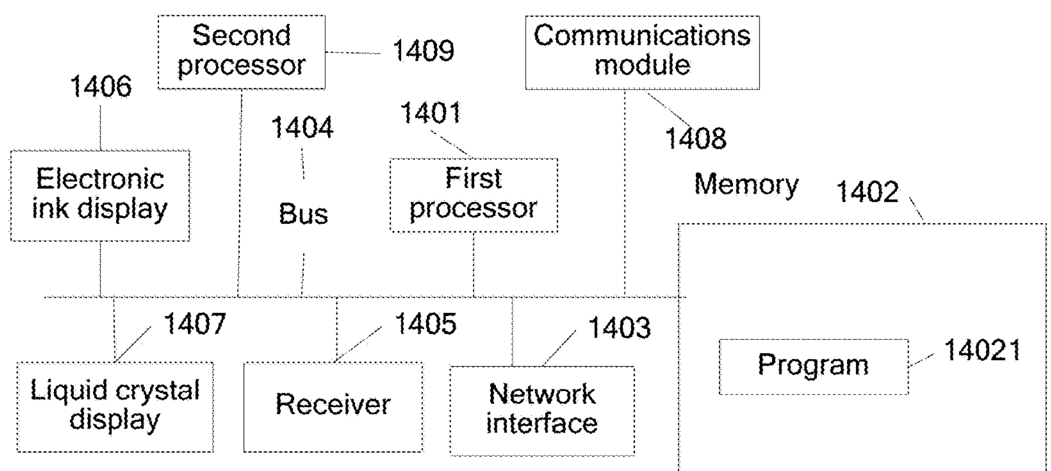
FIG. 14 is a structural diagram of another intelligent terminal according to another embodiment of the present disclosure.

FIG. 14 describes a structure of an intelligent terminal according to another embodiment of the present disclosure, where the intelligent terminal is a second intelligent terminal, including at least one first processor 1401 (for example, a central processing unit), a memory 1402, at least one network interface 1403, at least one communications bus 1404, at least one receiver 1405, an electronic ink display 1406, a liquid crystal display 1407, a communications module 1408, and at least one second processor 1409 (for example, an embedded single-chip microcomputer). The processor 1401 is configured to execute an executable module stored in the memory 1402, such as a computer program. The memory 1402 may include a high-speed random access memory (RAM), and may further include a non-volatile memory, for example, at least an embedded multimedia card (eMMC) memory. Through the at least one network interface 1403 (which may be wired or wireless), a communication connection between a network device and at least one other network element is implemented by using the Internet, a wide area network, a local area network, a metropolitan area network, or the like.

In some implementation manners, the memory 1402 stores a program 14021, and the program 14021 can be executed by the processor 1401. This program includes acquiring a power-saving control policy, where the power-saving control policy includes an interval for enabling a communications module; the interval for enabling the communications module is greater than a power-saving period of the communications module; and the power-saving period is a built-in power-saving control policy of the communications module, counting duration when the interval for enabling the communications module is acquired, enabling the communications module to perform communication when the duration is greater than or equal to the interval for enabling the communications module, and disabling the communications module when the communication ends.

Optionally, the enabling the communications module to perform communication includes enabling the communications module, and acquiring, by using the communications module, a to-be-processed task from a first intelligent terminal that communicates with the second intelligent terminal.

The disabling the communications module when the communication ends includes disabling the communications module when the to-be-processed task is processed.

Optionally, the acquiring, by using the communications module, a to-be-processed task from a first intelligent terminal that communicates with the second intelligent terminal includes sending a query request to the first intelligent terminal, where the query request includes a type of a notification that needs to be queried, so that the first intelligent terminal acquires, from a cache, a notification that matches the type of the notification that needs to be queried, and receiving a notification sent by the peer end.

The disabling the communications module when the to-be-processed task is processed includes disabling the communications module when the received notification is processed.

Optionally, the acquiring, by using the communications module, a to-be-processed task from a first intelligent terminal that communicates with the second intelligent terminal includes receiving, by using the communications module, a notification pushed by the first intelligent terminal that communicates with the second intelligent terminal, where the notification is a message notification to which the intelligent terminal subscribes.

The disabling the communications module when the to-be-processed task is processed includes disabling the communications module when the notification is processed.

Optionally, the power-saving control policy further includes a power-saving control policy status identifier.

The counting duration includes counting, by the second intelligent terminal, the duration when the interval for enabling the communications module is acquired and the power-saving control policy status identifier is an enabling identifier.

Optionally, the power-saving control policy further includes a first preset power threshold, and the second intelligent terminal includes an ink display and a liquid crystal display.

When the power-saving control policy status identifier is an enabling identifier, the program 14021 further includes monitoring remaining power, and enabling the electronic ink display and disabling the liquid crystal display when the remaining power is less than or equal to the first preset power threshold.

Optionally, the power-saving control policy further includes a second preset power threshold.

After the monitoring remaining power, the program 14021 further includes instructing a first processor to stop running, and instructing a second processor to process a task of the first processor when the remaining power is less than or equal to the first preset power threshold, where power consumption of the second processor is less than power consumption of the first processor.

Optionally, before the instructing a first processor to stop running, the program 14021 further includes acquiring a first task executed by the first processor, matching the first task with a preset basic task list to obtain a second task, and migrating the second task to the second processor for processing.

Optionally, the migrating the second task to the second processor for processing includes migrating data of the second task from the first processor to the second processor, and instructing the first processor to enter a hibernation state.

It can be learned from the foregoing description that by using the intelligent terminal power-saving management method provided in this embodiment of the present disclosure, enabling and disabling of a communications module are periodically controlled, which saves power and extends usage time of an intelligent terminal in a case in which normal use of the intelligent terminal is ensured. Further, screen switching and processor switching are performed by monitoring remaining power, which also saves power, extends usage time of the intelligent terminal, and enhances user experience.

Figure 15:
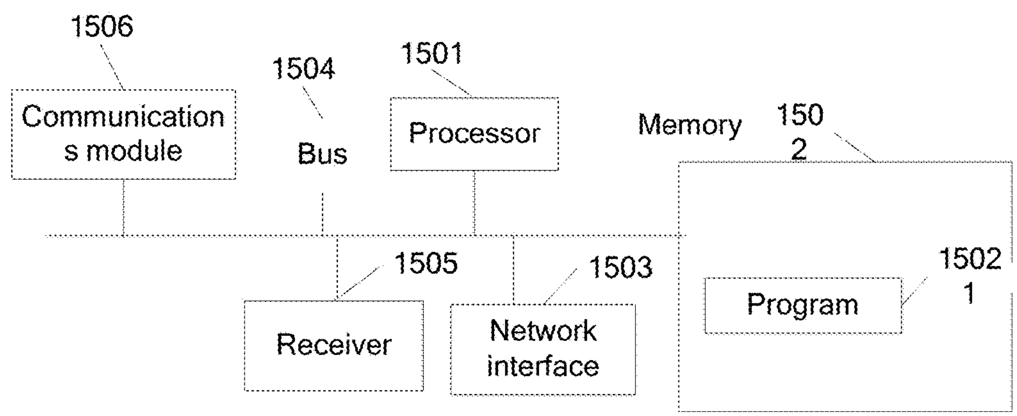
FIG. 15 is a structural diagram of another intelligent terminal according to another embodiment of the present disclosure.

FIG. 15 describes a structure of an intelligent terminal according to another embodiment of the present disclosure, where the intelligent terminal includes at least one processor 1501 (for example, a central processing unit), a memory 1502, at least one network interface 1503, at least one communications bus 1504, at least one receiver 1505, and a communications module 1506. The processor 1501 is configured to execute an executable module stored in the memory 1502, such as a computer program. The memory 1502 may include a high-speed RAM, and may further include a non-volatile memory, for example, at least an eMMC memory. Through the at least one network interface 1503 (which may be wired or wireless), a communication connection between a network device and at least one other network element is implemented by using the Internet, a wide area network, a local area network, a metropolitan area network, or the like.

In some implementation manners, the memory 1502 stores a program 15021, and the program 15021 can be executed by the processor 1501. This program includes establishing a connection with a second intelligent terminal, acquiring an interval for enabling a communications module of the second intelligent terminal, determining a state of the communications module of the second intelligent terminal according to the interval for enabling the communications module, storing a message that needs to be sent to the second intelligent terminal when the communications module of the second intelligent terminal is in a disabled state, and sending, to the second intelligent terminal, the stored message that needs to be sent to the second intelligent terminal when the communications module of the second intelligent terminal is in an enabled state.

Optionally, before the sending the stored message that needs to be sent to the second intelligent terminal, the program 15021 further includes receiving a message acquiring request sent by the second terminal.

The sending, to the second intelligent terminal, the stored message that needs to be sent to the second intelligent terminal includes sending, to the second intelligent terminal according to the request, the stored message that needs to be sent to the second intelligent terminal.

It can be learned from the foregoing description that by using the technical solution provided in this embodiment of the present disclosure, after a connection is established with a second intelligent terminal, a temporarily stored message is pushed to the second intelligent terminal, so that the second intelligent terminal processes a message that is not processed during disabling of a communications module, thereby enabling the second intelligent terminal to keep normal running of a function in the case of power saving.

Figure 16:
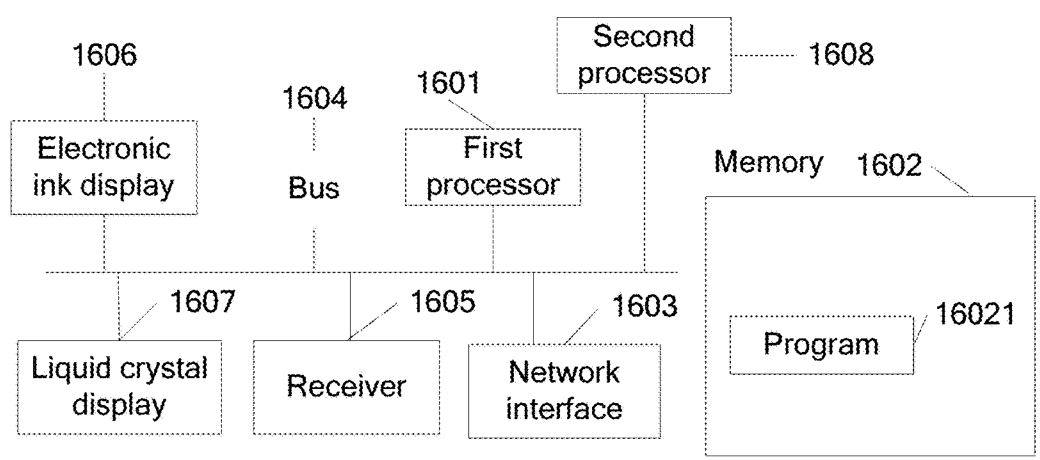
FIG. 16 is a structural diagram of another intelligent terminal according to another embodiment of the present disclosure.

FIG. 16 describes a structure of an intelligent terminal according to another embodiment of the present disclosure, where the intelligent terminal includes at least one first processor 1601 (for example, a central processing unit), a memory 1602, at least one network interface 1603, at least one communications bus 1604, at least one receiver 1605, an electronic ink display 1606, a liquid crystal display 1607, and a second processor 1608 (for example, an embedded single-chip microcomputer). The processor 1601 is configured to execute an executable module stored in the memory 1602, such as a computer program. The memory 1602 may include a high-speed RAM, and may further include a non-volatile memory, for example, at least an eMMC memory. Through the at least one network interface 1603 (which may be wired or wireless), a communication connection between a network device and at least one other network element is implemented by using the Internet, a wide area network, a local area network, a metropolitan area network, or the like.

In some implementation manners, the memory 1602 stores a program 16021, and the program 16021 can be executed by the processor 1601. This program includes acquiring a power-saving control policy, where the power-saving control policy includes a first preset power threshold, monitoring remaining power, and enabling an electronic ink display and disabling a liquid crystal display when the remaining power is less than or equal to the first preset power threshold.

Optionally, the power-saving control policy further includes a second preset power threshold.

After the monitoring remaining power, the program 16021 further includes instructing a first processor to stop running, and instructing a second processor to process a task of the first processor when the remaining power is less than or equal to the second preset power threshold, where power consumption of the second processor is less than power consumption of the first processor.

Optionally, the second processor is an embedded single-chip microcomputer.

Optionally, before the instructing a first processor to stop running, the program 16021 further includes acquiring a first task executed by the first processor, matching the first task with a preset basic task list to obtain a second task, and migrating the second task to the second processor.

Optionally, the migrating the second task to the second processor includes migrating data of the second task from the first processor to the second processor, and the instructing a first processor to stop running includes instructing the first processor to enter a hibernation state.

It can be learned from the foregoing description that by using the embodiment provided in the present disclosure, remaining power is monitored, and it is determined, according to the remaining power, whether to switch a screen of an intelligent terminal and whether to switch a processor, thereby reducing power consumption, extending standby time of the intelligent terminal, and enhancing user experience in a case in which normal running of a function is ensured.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. In addition, a person skilled in the art should also understand that all the embodiments described in this specification belong to exemplary embodiments, and the involved actions and modules are not necessarily mandatory to the present disclosure.

Content such as information exchange and an execution process between the modules in the foregoing apparatus and system is based on a same idea as the method embodiments of the present disclosure. Therefore, for detailed content, refer to descriptions in the method embodiments of the present disclosure, and details are not described herein again.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include a magnetic disk, an optical disc, a read-only memory (ROM), or a RAM.

Specific examples are used in this specification to describe the principle and implementation manners of the present disclosure. The descriptions of the foregoing embodiments are merely intended to help understand the method and idea of the present disclosure. In addition, with respect to the implementation manners and the application scope, modifications may be made by a person of ordinary skill in the art according to the idea of the present disclosure. Therefore, this specification shall not be construed as a limitation on the present disclosure.

What is claimed is:

1. An intelligent terminal power-saving management method, comprising:

acquiring, by a second intelligent terminal, a power-saving control policy, wherein the power-saving control policy comprises an interval for enabling a communications module, wherein the interval for enabling the communications module is greater than a power-saving period of the communications module, and wherein the power-saving period is a built-in power-saving control policy of the communications module;

counting, by the second intelligent terminal, duration when the interval for enabling the communications module is acquired;

enabling, by the second intelligent terminal, the communications module to perform communication with a first intelligent terminal when the duration is greater than or equal to the interval for enabling the communications module, wherein the first intelligent terminal is a first user equipment (UE) and the second intelligent terminal is a second UE; and disabling, by the second intelligent terminal, the communications module when the communication ends.

2. The method according to claim 1, wherein enabling, by the second intelligent terminal, the communications module to perform communication comprises:

enabling, by the second intelligent terminal, the communications module; and acquiring, by the second intelligent terminal, a to-be-processed task from the first intelligent terminal using the communication module, and wherein disabling, by the second intelligent terminal, the communications module when the communication ends comprises disabling, by the second intelligent terminal, the communications module when the to-be-processed task is processed.

3. The method according to claim 2, wherein the to-be-processed task comprises a type of a notification that needs to be queried, wherein acquiring, by the second intelligent terminal, the to-be-processed task from the first intelligent terminal using the communication module comprises:

sending a query request to the first intelligent terminal, wherein the query request comprises the type of the notification that needs to be queried, so that the first intelligent terminal acquires, from a cache, a notification that matches the type of the notification that needs to be queried; and receiving a notification from the first intelligent terminal, and wherein disabling, by the second intelligent terminal, the communications module when the to-be-processed task is processed comprises disabling, by the second intelligent terminal, the communications module when the received notification is processed.

4. The method according to claim 2, wherein the to-be-processed task comprises a type of a notification that needs to be queried, and wherein acquiring, by the second intelligent terminal, the to-be-processed task from the first intelligent terminal using the communications module comprises receiving, using the communications module, a notification from the first intelligent terminal, wherein the notification is a message notification to which the second intelligent terminal subscribes, and wherein disabling, by the second intelligent terminal, the communications module when the to-be-processed task is processed comprises disabling, by the second intelligent terminal, the communications module when the notification is processed.

5. The method according to claim 1, wherein the power-saving control policy further comprises a power-saving control policy status identifier, and wherein acquiring counting duration when the interval for enabling the communications module comprises counting, by the second intelligent terminal, the duration when the interval for enabling the communications module is acquired and the power-saving control policy status identifier is an enabling identifier.

6. The method according to claim 5, wherein the power-saving control policy further comprises a first preset power threshold, wherein the second intelligent terminal comprises an electronic ink display and a liquid crystal display, wherein when the power-saving control policy status identifier is an enabling identifier, and wherein the method further comprises:

monitoring, by the second intelligent terminal, remaining power;

enabling, by the second intelligent terminal, the electronic ink display; and disabling, by the second intelligent terminal, the liquid crystal display when the remaining power is less than or equal to the first preset power threshold.

7. The method according to claim 6, wherein the power-saving control policy further comprises a second preset power threshold, wherein after monitoring remaining power, wherein the method further comprises:

instructing, by the second intelligent terminal, a first processor to stop running; and instructing a second processor to process a task of the first processor when the remaining power is less than or equal to the second preset power threshold, and wherein power consumption of the second processor is less than power consumption of the first processor.

8. The method according to claim 7, wherein before instructing, by the second intelligent terminal, the first processor to stop running, the method further comprises:

acquiring, by the second intelligent terminal, a first task executed by the first processor;

matching, by the second intelligent terminal, the first task with a preset basic task list to obtain a second task; and migrating, by the second intelligent terminal, the second task to the second processor for processing.

9. The method according to claim 8, wherein migrating, by the second intelligent terminal, the second task to the second processor for processing comprises:

migrating, by the second intelligent terminal, data of the second task from the first processor to the second processor; and instructing the first processor to enter a hibernation state.

10. An intelligent terminal power-saving management method comprising:

establishing, by a first intelligent terminal, a connection with a second intelligent terminal, wherein the first intelligent terminal is a first user equipment (UE) and the second intelligent terminal is a second UE;

acquiring, by the first intelligent terminal, an interval for enabling a communications module of the second intelligent terminal;

determining, by the first intelligent terminal, a state of the communications module of the second intelligent terminal;

storing, by the first intelligent terminal, a message to be sent to the second intelligent terminal when the communications module of the second intelligent terminal is in a disabled state;

receiving, by the first intelligent terminal, a message acquiring request from the second intelligent terminal; and sending, to the second intelligent terminal by the first intelligent terminal according to the request, the stored message when the communications module of the second intelligent terminal is in an enabled state.

11. An intelligent terminal power-saving management method comprising:

acquiring a power-saving control policy, wherein the power-saving control policy comprises a first preset power threshold;

monitoring remaining power, wherein the power-saving control policy further comprises a second preset power threshold;

instructing a first processor to stop running after the monitoring remaining power;

instructing a second processor to process a task of the first processor when the remaining power is less than or equal to the second preset power threshold, wherein power consumption of the second processor is less than the power consumption of the first processor;

enabling an electronic ink display when the remaining power is less than or equal to the first preset power threshold; and disabling a liquid crystal display when the remaining power is less than or equal to the first preset power threshold.

12. The method according to claim 11, wherein the second processor is an embedded single-chip microcomputer.

13. The method according to claim 11, wherein before instructing the first processor to stop running, the method further comprises:

acquiring a first task executed by the first processor;

matching the first task with a preset basic task list to obtain a second task; and migrating the second task to the second processor.

14. The method according to claim 13, wherein migrating the second task to the second processor comprises migrating data of the second task from the first processor to the second processor, and wherein instructing a first processor to stop running comprises instructing the first processor to enter a hibernation state.

15. An intelligent terminal, wherein the intelligent terminal is a second intelligent terminal, and wherein the second intelligent terminal comprises:

a memory storing executable instructions; and a processor coupled to the memory and configured to:

acquire a power-saving control policy, wherein the power-saving control policy comprises an interval for enabling a communications module, wherein the interval for enabling the communications module is greater than a power-saving period of the communications module, and wherein the power-saving period is a built-in power-saving control policy of the communications module;

count duration when the interval for enabling the communications module is acquired;

enable the communications module to perform communication with a first intelligent terminal when the duration is greater than or equal to the interval for enabling the communications module, wherein the first intelligent terminal is a first user equipment (UE) and the intelligent terminal is a second UE; and disable the communications module when the communication ends.

16. The intelligent terminal according to claim 15, wherein the processor is further configured to:

enable the communications module; and acquire, using the communications module, a to-be-processed task from the first intelligent terminal that communicates with the second intelligent terminal, and wherein the processor is configured to disable the communications module when the to-be-processed task is processed.

17. The intelligent terminal according to claim 16, wherein the to-be-processed task comprises a type of a notification that needs to be queried, wherein the processor is further configured to:

send a query request to the first intelligent terminal, and wherein the query request comprises the type of the notification that needs to be queried, so that the first intelligent terminal acquires, from a cache, a notification that matches the type of the notification that needs to be queried;

receive a notification from a peer end; and disable the communications module when the received notification is processed.

18. The intelligent terminal according to claim 16, wherein the processor is further configured to:

receive, using the communications module, a notification from the first intelligent terminal, wherein the notification is a message notification to which the second intelligent terminal subscribes; and disable the communications module when the notification is processed.

19. The intelligent terminal according to claim 16, wherein the power-saving control policy further comprises a power-saving control policy status identifier, and wherein the processor is further configured to count the duration when the interval for enabling the communications module is acquired and the power-saving control policy status identifier is an enabling identifier.

20. The intelligent terminal according to claim 19, wherein the power-saving control policy further comprises a first preset power threshold, wherein the second intelligent terminal comprises:

an electronic ink display; and a liquid crystal display, and wherein the processor is further configured to:

monitor remaining power when the power-saving control policy status identifier is an enabling identifier; and enable the electronic ink display and disable the liquid crystal display when the remaining power is less than or equal to the first preset power threshold.

21. The intelligent terminal according to claim 20, wherein the power-saving control policy further comprises a second preset power threshold, wherein the processor is further configured to:

instruct a first processor to stop running; and instruct a second processor to process a task of the first processor when the remaining power is less than or equal to the second preset power threshold, and wherein power consumption of the second processor is less than power consumption of the first processor.

22. The intelligent terminal according to claim 21, wherein the processor is further configured to:

match a first task with a preset basic task list to obtain a second task;

migrate the second task to the second processor, wherein the processor is configured to acquire the first task executed by the first processor;

instruct the first processor to stop running; and instruct the second processor to process the second task when migrating the second task to the second processor.

23. The intelligent terminal according to claim 22, wherein the processor is further configured to:

migrate data of the second task from the first processor to the second processor;

instruct the first processor to enter a hibernation state; and instruct the second processor to process the second task when the data of the second task is migrated from the first processor to the second processor.

24. An intelligent terminal, wherein the intelligent terminal is a first intelligent terminal, and wherein the first intelligent terminal comprises:

a processor configured to:

establish a connection with a second intelligent terminal, wherein the first intelligent terminal is first user equipment (UE) and the second intelligent terminal is a second UE;

acquire an interval for enabling a communications module of the second intelligent terminal; and determine a state of the communications module of the second intelligent terminal according to the interval for enabling the communications module;

a memory coupled to the processor and configured to store a message to be sent to the second intelligent terminal when the communications module of the second intelligent terminal is in a disabled state;

a receiver coupled to the processor and configured to receive a message acquiring request sent by the second intelligent terminal; and a transmitter coupled to the processor and configured to send, to the second intelligent terminal according to the request, the stored message when the communications module of the second intelligent terminal is in an enabled state.

25. An intelligent terminal comprising:

a memory storing executable instructions; and a processor coupled to the memory and configured to:

acquire a power-saving control policy, wherein the power-saving control policy comprises a first preset power threshold;

monitor remaining power, wherein the power-saving control policy further comprises a second preset power threshold;

instruct a first processor to stop running; and instruct a second processor to process a task of the first processor when the remaining power is less than or equal to the second preset power threshold, wherein power consumption of the second processor is less than power consumption of the first processor; and enable an electronic ink display and disable a liquid crystal display when the remaining power is less than or equal to the first preset power threshold.

26. The intelligent terminal according to claim 25, wherein the second processor is an embedded single-chip microcomputer.

27. The intelligent terminal according to claim 25, wherein the processor is further configured to:

match a first task with a preset basic task list to obtain a second task;

migrate the second task to the second processor;

acquire the first task executed by the first processor;

instruct the first processor to stop running; and instruct the second processor to process the second task when migrating the second task to the second processor.

28. The intelligent terminal according to claim 27, wherein the processor is further configured to:

migrate data of the second task from the first processor to the second processor;

instruct the first processor to enter a hibernation state; and instruct the second processor to process the second task when the migrating the data of the second task from the first processor to the second processor.

* * * * *